(12) United States Patent
Campbell et al.

(10) Patent No.: US 8,643,920 B2
(45) Date of Patent: Feb. 4, 2014

(54) GRAY BALANCE CALIBRATION IN AN IMAGE PRINTING SYSTEM

(75) Inventors: James B. Campbell, Beaverton, OR (US); Luo Cheng, Beaverton, OR (US)

(73) Assignee: Xerox Corporation, Norwalk, CT (US)

(*) Notice: Subject to any disclaimer, the term of this patent is extended or adjusted under 35 U.S.C. 154(b) by 279 days.

(21) Appl. No.: 13/167,480

(22) Filed: Jun. 23, 2011

(65) Prior Publication Data
US 2012/0327476 A1  Dec. 27, 2012

(51) Int. Cl.
*H04N 1/46* (2006.01)
(52) U.S. Cl.
USPC ............ 358/504; 358/1.9; 358/3.01; 358/518
(58) Field of Classification Search
None
See application file for complete search history.

(56) References Cited

U.S. PATENT DOCUMENTS

| | | | |
|---|---|---|---|
| 6,975,949 B2 | 12/2005 | Mestha et al. | |
| 6,982,812 B2 * | 1/2006 | Johnson | 358/1.9 |
| 7,027,182 B1 * | 4/2006 | Soler | 358/1.9 |
| 7,239,427 B2 * | 7/2007 | Tezuka et al. | 358/2.1 |
| 7,505,173 B2 | 3/2009 | Viturro et al. | |
| 7,656,554 B2 * | 2/2010 | Deer et al. | 358/1.9 |
| 8,159,719 B2 * | 4/2012 | Bestmann | 358/3.01 |
| 8,287,113 B2 * | 10/2012 | Donovan et al. | 347/100 |
| 2006/0181587 A1 * | 8/2006 | Bauer et al. | 347/100 |
| 2009/0296085 A1 * | 12/2009 | Mestha | 356/319 |
| 2010/0232652 A1 | 9/2010 | Yeh et al. | |

* cited by examiner

*Primary Examiner* — Dung Tran
(74) *Attorney, Agent, or Firm* — Pillsbury Winthrop Shaw Pittman LLP

(57) ABSTRACT

A computer-implemented method for gray balance calibration in an image printing system is provided. The method includes printing, using a print engine, a reference test pattern consisting essentially of black marking medium; sensing, using a sensor, the reference test pattern to obtain a reference image data, the reference image data being a function of the black marking medium; printing, using the print engine, a second test pattern comprising a combination of marking mediums of different colors, other than the color black, available on the image printing system to simulate the black marking medium; sensing, using the sensor, the second test pattern to obtain a second image data, the second image data being a function of the combination of marking mediums; and determining a difference between the reference image data and the second image data to obtain a correction offset for gray balance calibration in the image printing system.

20 Claims, 9 Drawing Sheets

GRAY BALANCE CALIBRATION IN AN IMAGE PRINTING SYSTEM

BACKGROUND

1. Field

The present disclosure relates to a system and a method for gray balance calibration in an image printing system.

2. Description of Related Art

Color image printing systems typically employ a plurality of inks of different primary colors to generate a spectrum of colors. For example, some color image printing systems use four ink colors: cyan (C), magenta (M), yellow (Y) and black (K). Color images are formed on a receiving substrate or medium by placing combinations of zero or more dots of C, M, Y or K ink at each pixel location. Cyan, magenta and yellow are typically employed since a wide range of colors can be produced by different combinations of these inks Ideally, equal amounts of C, M and Y inks should result in a gray color. However, due to a variety of factors, equal amounts of C, M and Y commonly do not produce gray colors, and image printing systems are commonly configured to perform gray balancing. For example, gray balancing can involve adjusting the amounts of C, M, and/or Y so that when the input color data contains equal amounts of CMY, the printed output is gray or substantially corresponds to a black output of the same density.

In image printing systems, all four colors of the image printing system are contained in each print head and are calibrated during print head manufacturing as a single unit. The relationship of intensity and/or drop mass of the individual colors to the other colors within the print head can be controlled during the manufacturing calibration process. This manufacturing process provides adequate control of the secondary and composite gray hue in the some image printing systems with a single print head platform.

In other image printing systems, where four print heads are assembled and are calibrated into one unit. A reference print head is first selected and the overall intensity and color balance in the other three print heads are normalized with respect to the reference print head in order to achieve the customer requirements for intensity and hue.

In image printing systems with a multi-print head platform, where four mono-color print heads are combined to produce a four-color image printing device, control of the head to head intensity is required to control the resulting hue in the secondary and composite gray colors. Setting drop mass on each of the four print heads is often too expensive and may not possible if the print head needs to be replaced. Therefore, a method to establish the intensity relationship among the four print heads is desired.

SUMMARY

According to one aspect of the present disclosure, a computer-implemented method for gray balance calibration in an image printing system is provided. The method is implemented in a computer system comprising one or more processors configured to execute one or more computer program modules. The method includes printing, using a print engine, a reference test pattern consisting essentially of black marking medium; sensing, using a sensor, the reference test pattern to obtain a reference image data, the reference image data being a function of the black marking medium; printing, using the print engine, a second test pattern comprising a combination of marking mediums of different colors, other than the color black, available on the image printing system to simulate the black marking medium; sensing, using the sensor, the second test pattern to obtain a second image data, the second image data being a function of the combination of marking mediums; and determining a difference between the reference image data and the second image data to obtain a correction offset for gray balance calibration in the image printing system.

According to another aspect of the present disclosure, a system for gray balance calibration in an image printing system is provided. The system includes a print engine, a sensor and a processor. The print engine is configured to print a) a reference test pattern consisting essentially of black marking medium, and b) a second test pattern comprising a combination of marking mediums of different colors, other than the color black, available on the image printing system to simulate the black marking medium. The sensor is configured to sense a) the reference test pattern to obtain a reference image data and b) the second test pattern to obtain a second image data. The reference image data is a function of the black marking medium and the second image data is a function of the combination of marking mediums. The processor is configured to determine a difference between the reference image data and the second image data to obtain a correction offset for gray balance calibration in the image printing system.

According to another aspect of the present disclosure, a method for printing a test pattern for gray balance calibration in an image printing system is provided. The method includes printing, using a print engine, a reference test pattern portion consisting essentially of black marking medium; and printing, using the print engine, a test pattern portion comprising a combination of marking mediums of different colors, other than the color black, available on the image printing system to simulate the black marking medium.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure proposes a method and a system for gray line calibration, for example, in a multi-color image printing system.

In describing the present disclosure, reference is made to various examples using a four color image printing system having cyan, magenta, yellow and black (CMYK) colors to describe the method and system of the present disclosure. Generalization to other image printing systems having additional and/or alternate colors is straightforward, however, and the use of particular examples using CMYK is not intended to limit the scope of the present disclosure. For example, the method and system of the present disclosure can be used in any other multi-color image printing systems such as CcMmYK six color system having black (K) as one of the colors. The CcMmYK color system includes Cyan (C), light Cyan (c), Magenta (M), light Magenta (m), Yellow (Y) and Black (K) colors.

The present disclosure uses a scanner to set the CMY balance for hue and intensity using black color as a reference. The present disclosure uses black (K) as the reference for at least two reasons. First, scanner has generally poor colorimetric performance. Second, within the image printing device, CMY are used to mimic color black (K). Therefore, the color difference between the scanner response of CMY colors as they make up composite black (K) and the scanner response of black (K) itself should be minimized.

The scanner measures the hue of the printed pure black (K) test pattern to generate a reference hue and measures the hue of the composite gray test pattern (e.g., obtained by combining C, M and Y colors). The measured hue of the printed pure black test pattern and the composite gray test pattern are used to understand the current performance of the different (i.e., CMY) color print heads in the image printing system.

In other words, the proposed disclosure acquires two sets of scanner responses: i) scanner R, G, B signals as a function of complementing colorants C, M, Y and ii) scanner R, G, B signals as a function of color black (K). Gray-balancing is achieved by mapping the first set of scanner responses to the second. As will be explained in detail below, the method can be applied to gray-balance both dithered colors via TRC adjustment and solid colors via voltage control. In general, TRC is a very effective means of controlling dithers in steps. Printhead voltage, however, does effect both the solid fills and the general performance of the dithers. If the response relative to dither level of each of the colors is roughly equal then an adequate gray may be obtained by simply controlling the printhead voltage.

Figure 1:
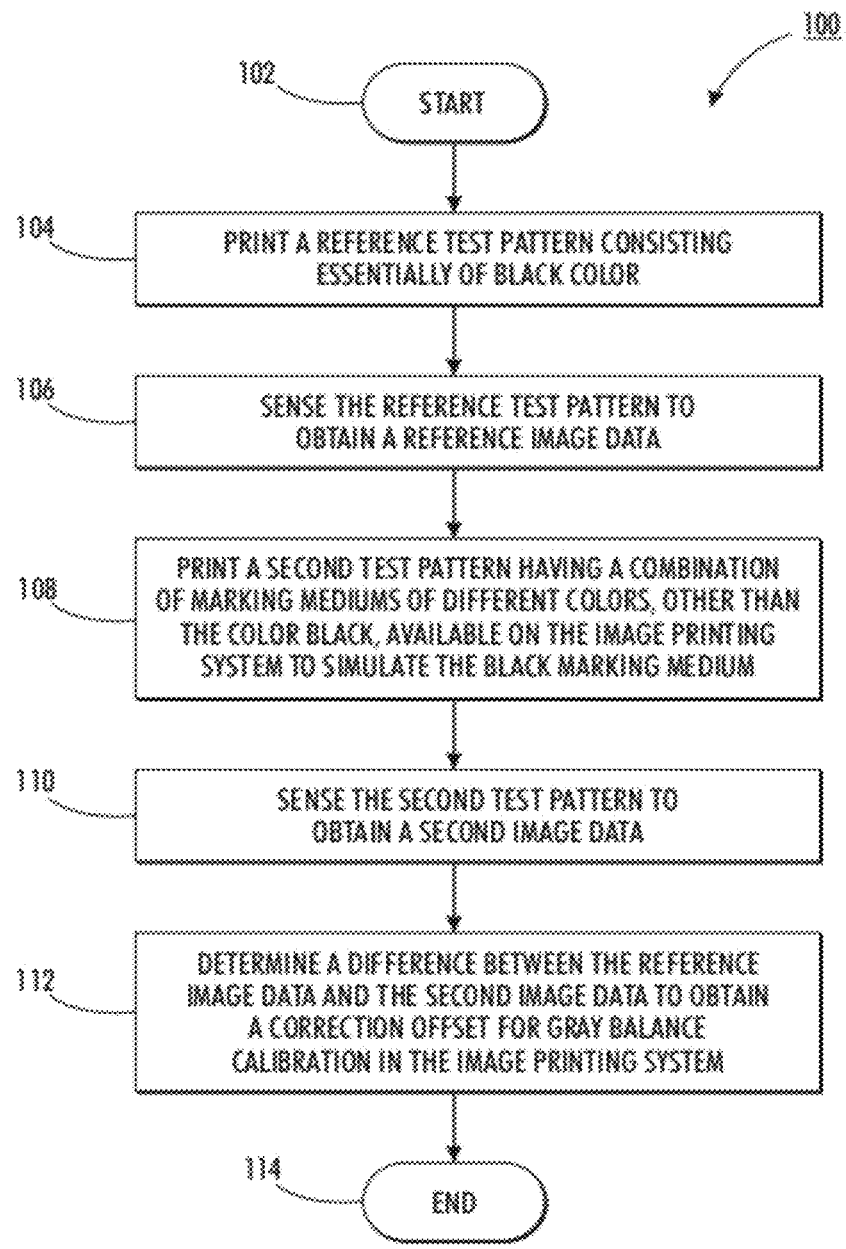
FIG. 1 illustrates a method for gray balance calibration in an image printing system in accordance with an embodiment of the present disclosure.

FIG. 1 illustrates a computer-implemented method 100 for gray balance calibration in an image printing system in accordance with an embodiment of the present disclosure. The method 100 is implemented in a computer system comprising one or more processors configured to execute one or more computer program modules.

The method 100 begins at procedure 102. At procedure 104, a print engine 204 is configured to print a reference test pattern consisting essentially of black marking medium. That is, the reference test pattern is formed using only black colored ink or marking medium. The print engine 204 is shown and described with respect to FIG. 2.

Figure 4A:
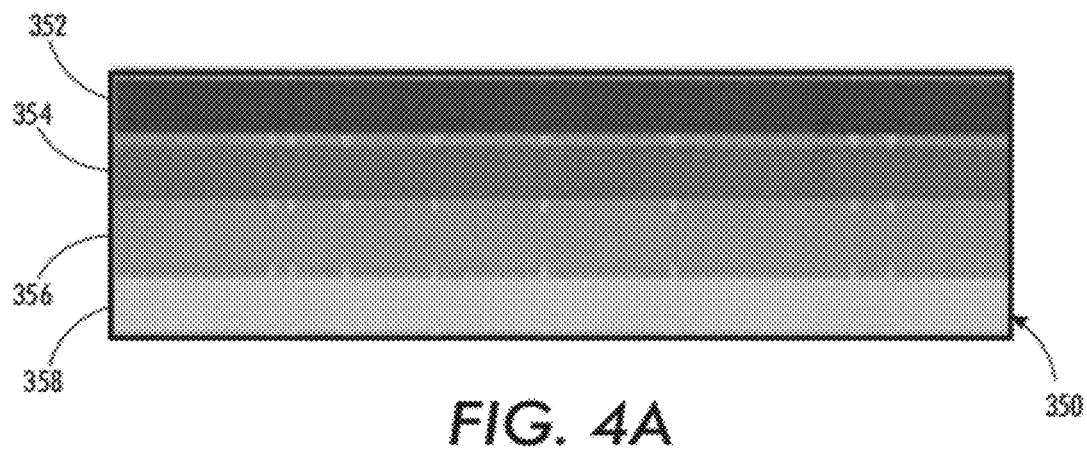
FIGS. 4A-4D illustrate test patterns and their intensity profiles used in dither gray line balance in accordance with an embodiment of the present disclosure.
Figure 8:
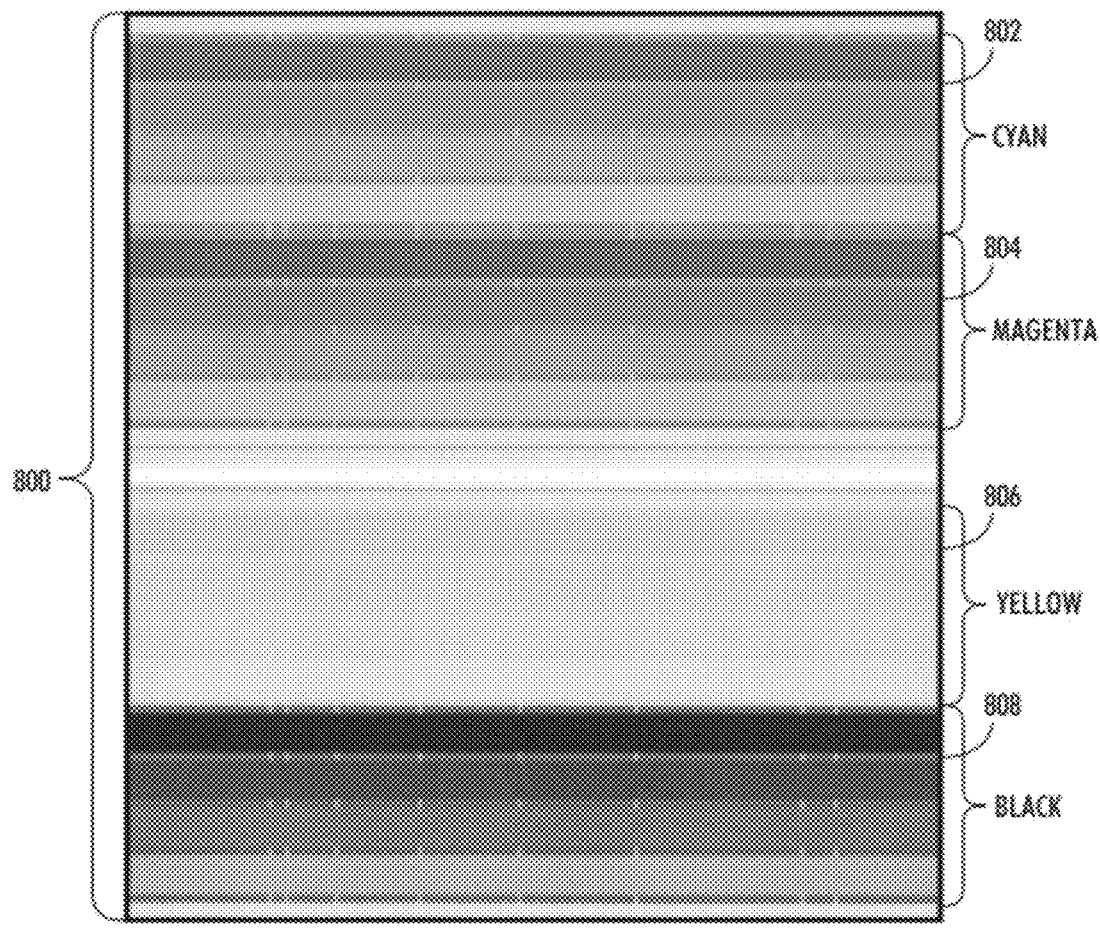
FIG. 8 illustrates a test pattern used in solid fill gray line balance in accordance with an embodiment of the present disclosure.

The reference test pattern may be printed on a printable media or sheet (e.g., paper of a given stock quality). Exemplary reference test patterns 350 and 808 are shown in FIGS. 4A and 8, respectively. The reference test pattern 350 is used for gray balance of dither colors, while the reference test pattern 808 is used for gray balance for solid colors.

At procedure 106, a sensor 206 is configured to sense the reference test pattern to obtain a reference image data. The reference image data is a function of the black marking medium. That is, the reference image data includes RGB signals of the sensor as a function of the black (K) color. The sensor 206 is shown and described with respect to FIG. 2.

Next at procedure 108, the print engine 204 is configured to print a second test pattern. The second test pattern includes a combination of marking mediums of different colors, other than the color black, available on the image printing system to simulate the black marking medium. For example, the second test pattern may include Cyan (C), Magenta (M) and Yellow (Y) inks or marking mediums. The combination of marking mediums of different colors, other than the color black, available on the image printing system produce a composite black color.

At procedure 110, the sensor 206 is configured to sense the second test pattern to obtain a second image data. The second image data is a function of the combination of different marking mediums. That is, the second image data includes RGB signals of the sensor as a function of complimentary colorants Cyan (C), Magenta (M) and Yellow (Y).

Next at procedure 112, a processor 208 is configured to determine a difference between the reference image data and the second image data to obtain a correction offset for gray balance calibration in the image printing system. The processor 208 is shown and described with respect to FIG. 2.

The procedure of determining a difference between the reference image data and the second image data may include obtaining CMY intensity profiles using the second image data and reference intensity profiles using the reference image data. The intensity profiles may be obtained by curve fitting (e.g., polynomial curve fitting) the image data. A method of curve fitting using polynomials is generally known in the art, and hence will not be described in detail here.

After the reference intensity profiles and the CMY intensity profiles are obtained, a difference between the CMY intensity profiles and the corresponding reference intensity profiles is calculated to compute the intensity correction offset.

The method 100 may also include an optional procedure where the obtained intensity correction offset may be maintained within a desired or optimal range using a closed loop feedback control. For example, the method 100 may be configured to compare the obtained intensity correction offset to a predetermined threshold. The predetermined threshold may be a value (numeric or percentage) or a range. When the correction offset exceeds the predetermined threshold, the method 100 returns to the procedure 104 to print a reference test pattern. The method 100 then proceeds to the procedure 106 and so on.

The method 100 further may include a procedure where a controller 210 is configured to apply the intensity correction offset to gray-balanced CMY Tone Reproduction Curves (TRCs) for gray balance calibration of dithered colors and/or to adjust voltages of print heads in the image printing system for gray balance calibration of solid colors. The controller 210 is shown and described with respect to FIG. 2.

Figure 3:
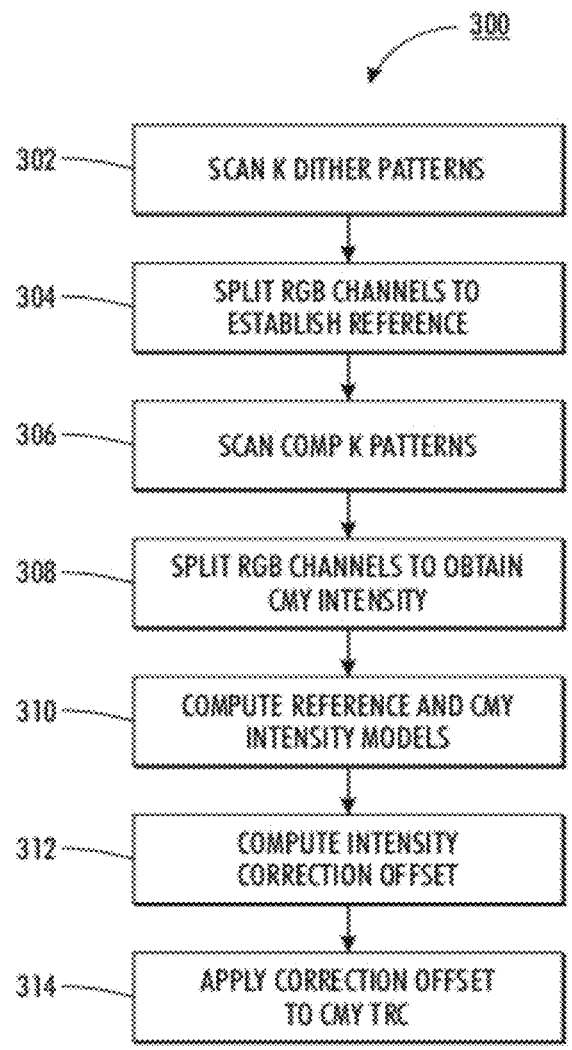
FIG. 3 illustrates a method for dither gray line balance in accordance with an embodiment of the present disclosure.
Figure 7:
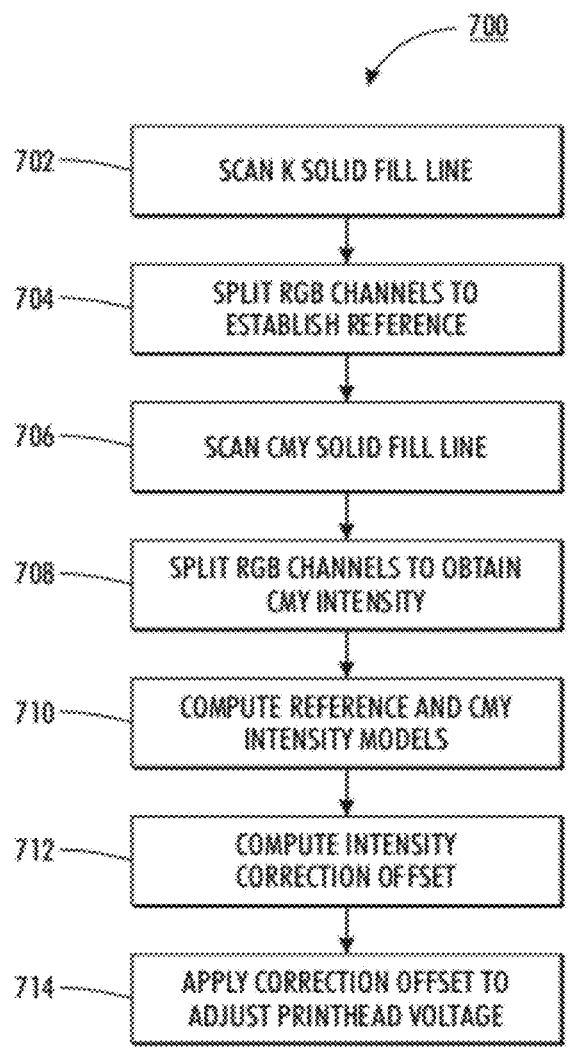
FIG. 7 illustrates a method for solid fill gray line balance in accordance with an embodiment of the present disclosure.

The method for dither color gray line balance is described in FIG. 3, while the method for solid fill gray line balance is described in FIG. 7. The method 100 ends at procedure 114.

Figure 2:
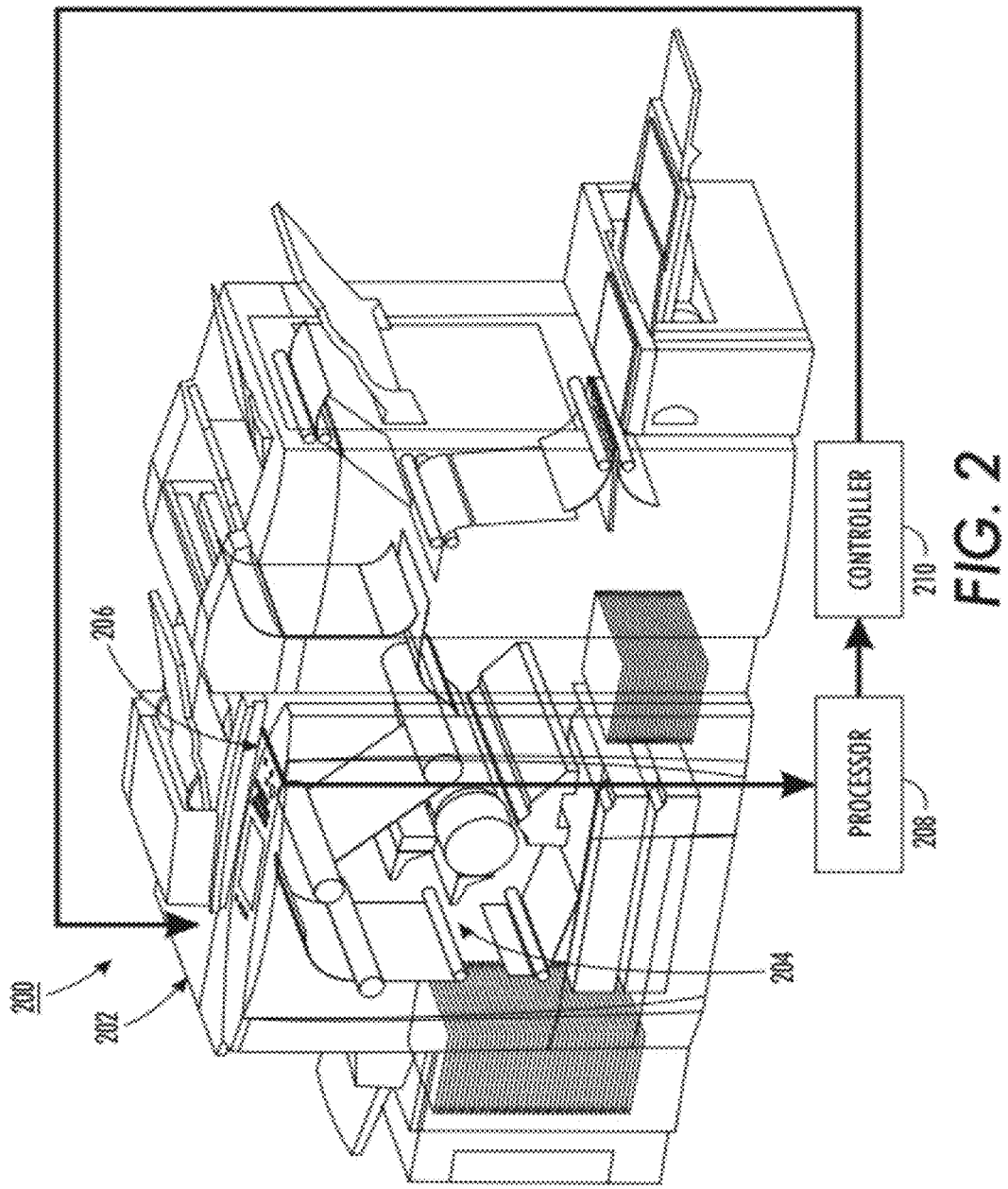
FIG. 2 illustrates a system for gray balance calibration in an image printing system in accordance with an embodiment of the present disclosure.

FIG. 2 illustrates a system 200 for gray balance calibration in an image printing system 202 in accordance with an embodiment of the present disclosure. The system 200 includes the print engine 204, the sensor 206, the processor 208, and the controller 210.

As illustrated, the print engine 204 is configured to create or form an image by propelling droplets of ink onto a receiving surface (e.g., a rotating drum, a belt, or other substrate for receiving ink ejected from the print heads) and then transferred to a substrate or medium. That is, color images are formed on the receiving surface by placing combinations of zero or more dots of different color inks at each pixel location. The print engine 204 includes one or more print heads, each print head contains a series of nozzles that are used to spray drops of ink onto receiving surface. Alternatively, the print heads may eject ink onto a substrate of media moving along a path adjacent to the print heads.

The print engine 204 is configured to print the reference test pattern consisting essentially of black marking medium and the second test pattern that includes a combination of different marking mediums of different colors, other than the color black, available on the image printing system 202 to simulate the black marking medium.

In one embodiment, the sensor 206 is a linear array sensor, such as a full width array (FWA). In another embodiment, the sensor 206 is a scanner.

In general, a full width array sensor is defined as a sensor that extends substantially an entire width (perpendicular to a direction of motion) of the prints. The full width array sensor is configured to detect any desired part of the printed image or control patches, while printing real images. The full width array sensor may include a plurality of sensors equally spaced at intervals (e.g., every 1/600th inch (600 spots per inch)) in the cross-process (or a fast scan) direction. See, for example, U.S. Pat. No. 6,975,949, incorporated herein by reference. It is understood that other linear array sensors may also be used, such as contact image sensors, CMOS array sensors or CCD array sensors. Although the full width array (FWA) sensor or contact sensor is shown in the illustrated embodiment, it is contemplated that the present disclosure may use sensor chips that are significantly smaller than the width of the prints, through the use of reductive optics. In one embodiment, the sensor chips may be in the form of an array that is, for example, one or two inches long and that manages to detect the entire area across the prints through reductive optics. In one embodiment, the processor 208 is provided to both calibrate the linear array sensor and to process the reflectance data detected by the linear array sensor. It could be dedicated hardware like ASICs or FPGAs, software, or a combination of dedicated hardware and software.

In one embodiment, the linear sensor array is associated with an image input scanner (e.g., 206 in FIG. 2) for scanning hard-copy documents. That is, in a digital copier (i.e., printer plus scanner), the input scanner is used not only for scanning hard-copy originals but also for scanning prints as they are being made by the printer. In other words, in one embodiment, the input scanner may act as an an off-line spectrophotometer for the printer.

The sensor 206 is configured to sense the reference test pattern to obtain a reference image data. The reference image data is a function of the black marking medium. That is, the reference image data includes RGB signals of the sensor as a function of the black (K) color.

The sensor 206 is also configured to sense the second test pattern to obtain a second image data. The second image data is a function of the combination of different marking mediums. That is, the second image data includes RGB signals of the sensor as a function of complimentary colorants Cyan (C), Magenta (M) and Yellow (Y).

The processor 208 can comprise either one or a plurality of processors therein. Thus, the term "processor" as used herein broadly refers to a single processor or multiple processors. In one embodiment, the processor 208 can be a part of or forming a computer system. The system 200 may include a memory to store data received and data generated by the processor 208.

The processor 208 is configured to determine a difference between the reference image data and the second image data to obtain a correction offset for gray balance calibration in the image printing system 202.

The CMY intensity profiles using the second image data and reference intensity profiles using the reference image data are obtained. In one embodiment, these intensity profiles may be obtained by curve fitting (e.g., polynomial curve fitting) the image data.

After the reference intensity profiles and the CMY intensity profiles are obtained, differences between the CMY intensity profiles and the corresponding reference intensity profiles are calculated to compute the intensity correction offsets. For example, a difference between the Cyan (C) intensity profile and the corresponding reference intensity profile (i.e., R channel scanner response obtained by scanning the reference test pattern) is calculated to compute the intensity correction offset for Cyan (C). Similarly, a difference between the Magenta (M) intensity profile and the corresponding reference intensity profile (i.e., G channel scanner response obtained by scanning the reference test pattern) is calculated to compute the intensity correction offset for Magenta (M). Also, a difference between the Yellow (Y) intensity profile and the corresponding reference intensity profile (i.e., B channel scanner response obtained by scanning the reference test pattern) is calculated to compute the intensity correction offset for Yellow (Y).

The controller 210 of the system 200 may be configured to adjust the print head voltages and, if needed, adjust the uniformity TRCs to minimize a) the hue difference or b) both the hue difference and the lightness difference between the pure black and the composite gray test patterns at full fire rate (i.e., voltage control for solid fills) and at partial fire rate (i.e., TRCs for dithered fills). By driving the compK RGB signal towards the K RGB signal, both gray balance and lightness equivalent to K may be achieved.

For example, the procedure for adjusting print head voltages in solid fill colors is explained in detail in U.S. Patent Application Publication No. 2010/0232652 titled "System And Method For Adjusting Operation Of Printhead In An Ink Printing Device," which herein are incorporated by reference in their entirety. It is contemplated that other opertaional parameters, for example, printhead norm may be adjusted to provide gray balance in solid fill colors. The printhead norm or the inkjet normalization adjustments may generally include a norm per color adjustment to make head to head intensity uniform for each solid fill color.

Also, procedure for adjusting the uniformity TRCs to provide gray balance, for example, is explained in detail in U.S. Pat. No. 7,505,173 ("the '173 patent") titled "System and Method For Spatial Gray Balance Calibration Using Hybrid Sensing Systems," which herein is incorporated by reference in its entirety. However, the '173 patent uses a spectrophotometer to measure spectral color information of neutral grays and, thus, obtain reference gray balance TRC. This reference gray balance TRC is used by color balance control system to adjust TRCs until a statisfactory level of printed color accuracy and unformity is obtained. In contrast, the present disclosure does not use a spectrophotometer. Instead, as noted above, the present disclosure uses a scanner to set the CMY balance for hue and intensity using black color as a reference. Also, the present disclosure uses the procedure for adjusting the uniformity TRCs to provide gray balance, for example, in dither colors.

FIG. 3 illustrates a method 300 for dither gray line balance in accordance with an embodiment of the present disclosure.

Dither or Dithered color as used herein may be described as a color produced by a pattern of differently colored dots that together simulate the desired color. In some embodiments, dither or dithered colors may be referred to as non-solid colors.

An exemplary reference or black (K) dither pattern 350 is shown in FIG. 4A. The test pattern 350 includes four pure black (K) dither strips 352-358 with different area coverages. These four pure black (K) dither strips 352-358 consist esentially of black marking medium. As will be described in detail below, these four level black (K) dither strips are used to establish reference points for the C, M, and Y adjustment. In other embodiments, the test pattern 350 may include eight strips with different area coverages.

At procedure 302, the black (K) dither pattern 350 is scanned using a scanner or sensor. Next at procedure 304, the reference image data is obtained by splitting RGB channels from the black (K) pattern image. That is, the reference image data is obtained by splitting the black (K) pattern image into three (i.e., R, G, and B) monochrome channels.

Figure 4B:
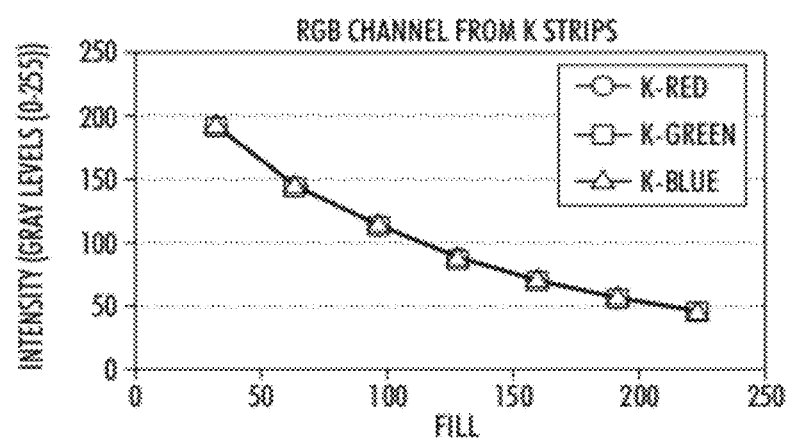

The reference image data includes scanner RGB signals as a function of black (K) marking medium. FIG. 4B shows intensity profile of the exemplary black (K) dither pattern 350 in which scanner RGB signals are a function of black (K) marking medium. As shown in FIG. 4B, three scanner (RGB) signals are overlapping each other indicating that black (K) is at a neutral gray level. Intensity profile from red channel serves as reference for cyan (C), and intensity profiles from green and blue channels serve as references for magenta (M) and yellow (Y), respectively.

Figure 4C:
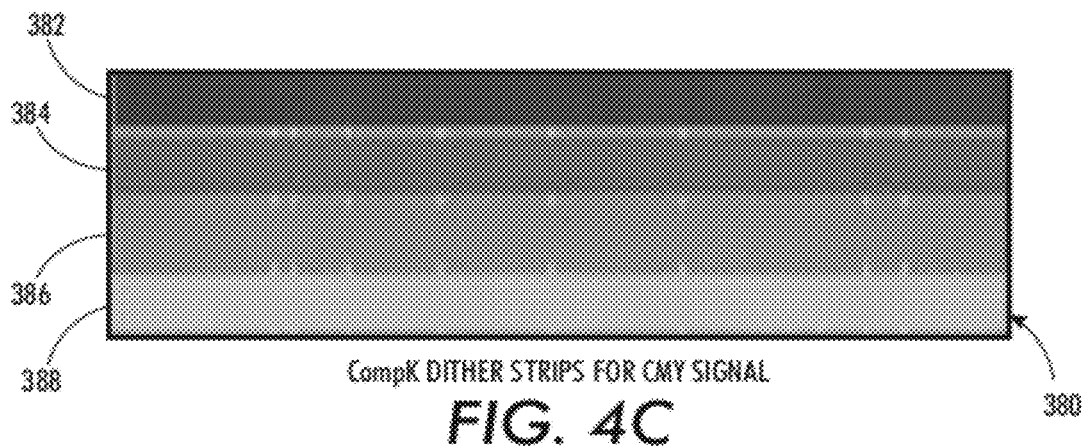

An exemplary composite gray or compK dither pattern 380 are shown in FIG. 4C. The test pattern 380 includes four compK dither strips 382-388 with different area coverages. These four level compK dither strips 382-388 include a combination of colors, other than the color black, available on the image printing system to simulate the black marking medium. For example, four level compK dither strips 382-388 are obtained by combining C, M and Y colors to produce composite or process black color or gray color. The compK dither strips 382-388 have the same area coverages as that of the pure black (K) dither strips 352-358. In other embodiments, the test pattern 380 may include eight strips with different area coverages.

At procedure 306, the compK dither pattern 380 is scanned using a scanner or sensor. Next at procedure 308, the second image data is obtained by splitting RGB channels from the compK pattern image. That is, the second image data is obtained by splitting the compK pattern image into three (i.e., R, G, and B) monochrome channels.

Figure 4D:
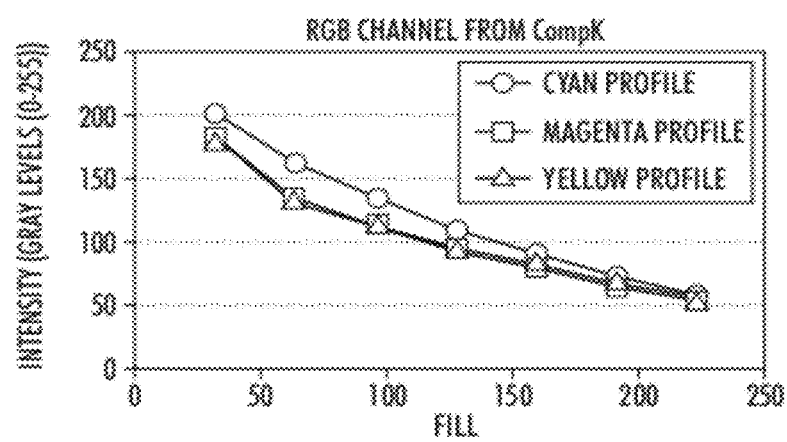

The second image data includes scanner RGB signals as a function of cyan (C), magenta (M) and yellow (Y). FIG. 4D shows intensity profile of the exemplary compK dither pattern of FIG. 4C, in which scanner RGB signals are a function of cyan (C), magenta (M) and yellow (Y). Intensity profile from red channel is the intensity profile for cyan (C), and intensity profiles from green and blue channels are the intensity profiles for magenta (M) and yellow (Y), respectively.

As shown in FIG. 4C, hue shift may be observed in the third and fourth strips 386 and 388 of the test pattern 380. The color cast or hue shift in general is a color deviation where colors are not represented in normal intensities. The hue shift is also shown in their intensity profiles (graph shown in FIG. 4D) where cyan profile is out of balance with magenta and yellow profiles. The hue shift is visible in the form of bluish, greenish or reddish grays depending on the image printing system.

The graphs shown in FIGS. 4B and 4D show intensity of the black (K) color and the intensity of compK color (i.e., the combination of CMY colors that produces composite/process black color or gray color) on their respective vertical y-axes. The intensity of the black (K) color and the intensity of compK color are expressed as an absolute number, usually in an 8 bit grayscale (0-255), as gray levels. On their respective horizontal x-axes, the profiles in FIGS. 4B and 4D illustrate fill or area coverage, expressed as a percentage value in an 8 bit value (0-255).

Next at procedure 310, reference intensity model and CMY intensity model may be obtained by using polynomial curve fitting. These reference intensity model and CMY intensity model may be obtained by using the test patterns (i.e., measured four or more dither levels of these test patterns) of FIGS. 4A and 4C. Model, as used herein, may in some (but not all) embodiments include a set of equations that are developed by measuring the test patterns of FIGS. 4A and 4B. These set of equations describe the reflectance of the test patterns of FIGS. 4A and 4B.

Figure 5A:
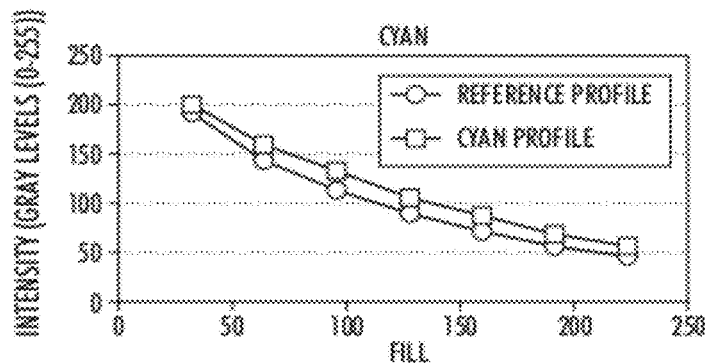
FIGS. 5A-5C illustrate CMY intensity profiles and their respective reference profiles used in dither gray line balance in accordance with an embodiment of the present disclosure.
Figure 5B:
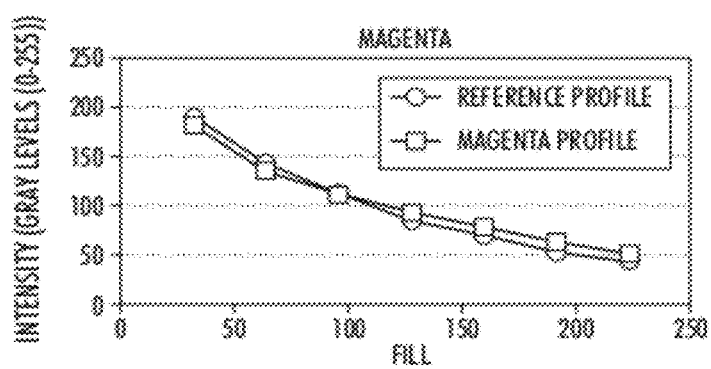
Figure 5C:
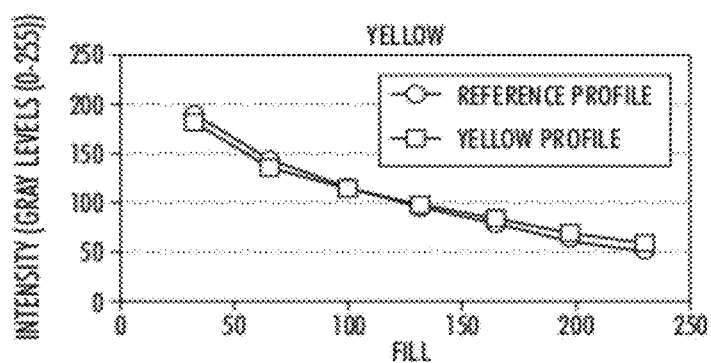

FIG. 5A illustrates C, M and Y profiles and their corresponding reference profiles used for dither gray line balance in accordance with an embodiment of the present disclosure. As shown in FIGS. 5A-5C, C, M, and Y adjustments can be quantified by comparing C, M and Y profiles with their reference profiles. The reference profiles shown in FIGS. 5A-C are obtained from the black (K) dither strip 350 (as shown in FIG. 4A), while the cyan, magenta and yellow profiles shown in FIGS. 5A-5C are obtained from the second compK dither strip 380 (shown in FIG. 4C). The gray balance may be achieved by driving CMY intensity profiles toward their reference K profiles so that the compK has the same hue as pure K.

At procedure 312, compensating offset for Cyan (C) is obtained by computing the difference between the Cyan (C) intensity model and corresponding K reference intensity model. The Cyan (C) intensity model and corresponding K reference intensity model are shown in FIG. 5A. Similarly, compensating offset for Magenta (M) is obtained by computing the difference between the Magenta (M) intensity model and corresponding K reference intensity model are shown in FIG. 5B. Compensating offset for Yellow (Y) is obtained by computing the difference between the Yellow (Y) intensity model and corresponding K reference intensity model are shown in FIG. 5C.

Next at procedure 314, this compensating or correction offset is applied to CMY Tone Reporduction Curves (TRC) for gray balance.

TABLE 1 below shows exemplary correction offsets for Tone reproduction curve (TRC). TABLE 1 lists the TRC offsets for seven TRC nodes. Using the linear interpolation, the TRC offsets may be expanded to 256 levels. The offsets are provided for Cyan (C), Magenta (M) and Yellow (Y) at different area coverages.

TABLE 1

| | Offset to TRC | | |
|---|---|---|---|
| Fill | Cyan (C) | Magenta (M) | Yellow (Y) |
| 31.875 | −0.01171 | −6.04787 | −5.14705 |
| 63.75 | 17.36489 | −3.1889 | −9.08136 |

TABLE 1-continued

| Offset to TRC | | | |
|---|---|---|---|
| Fill | Cyan (C) | Magenta (M) | Yellow (Y) |
| 95.625 | 25.23204 | 2.35243 | −3.17776 |
| 127.5 | 23.70583 | 5.938903 | 2.222342 |
| 159.375 | 24.28785 | 13.22766 | 10.61173 |
| 191.25 | 23.38428 | 16.74014 | 14.96388 |
| 223.125 | 28.13593 | 23.63129 | 21.68135 |

Figure 6A:
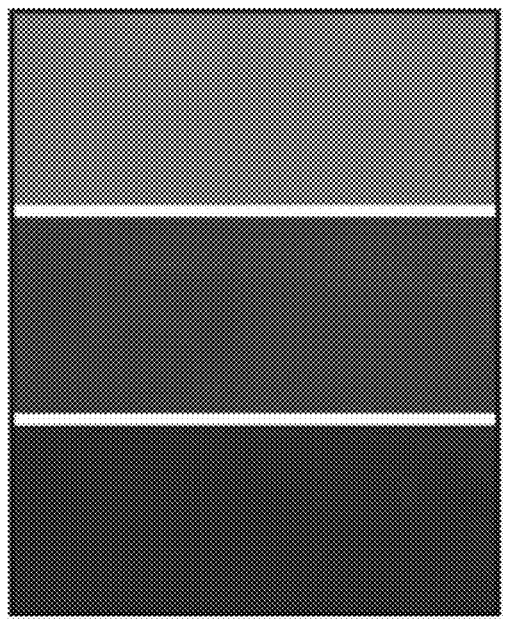
FIGS. 6A and 6B illustrate a compK test pattern before and after gray balance in accordance with an embodiment of the present disclosure.
Figure 6B:
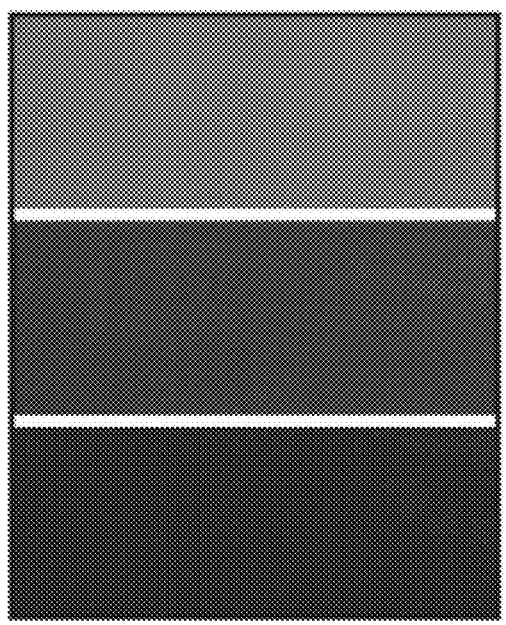

The results of gray line balance using the 256 level TRC offsets are shown in FIGS. 6A and 6B. FIGS. 6A and 6B illustrate composite gray or compK test patterns 602 and 604 printed before and after gray balance in accordance with an embodiment of the present disclosure. In the composite gray or compK test pattern 602, the hue shift is visible in the form of reddish grays. In the composite gray or compK test pattern 604, the hue shift is minimized and the desired test pattern is correctly rendered. Therefore, based on the comparision of the composite gray or compK test patterns 602 and 604, it is clear that the method 300 minimizes the hue difference or the hue difference and the lightness difference between the pure black pattern (of FIG. 4A) and the composite gray pattern (of FIG. 4C).

FIG. 7 illustrates a method for solid fill gray line balance in accordance with an embodiment of the present disclosure.

At procedure 702, black (K) soild fill pattern is scanned using a scanner or sensor. Next at procedure 704, the reference image data is obtained by splitting RGB channels from the reference (black (K)) pattern image. The reference image data includes scanner RGB as a function of black (K). At procedure 706, compK solid fill pattern is scanned using a scanner or sensor. Next at procedure 708, the second image data is obtained by splitting RGB channels from the compK pattern image. The second image data includes scanner RGB as a function of cyan (C), magenta (M) and yellow (Y).

An exemplary test pattern 800 used for solid fill gray balance is shown in FIG. 8. For solid fill gray balance, because the issue of scanner sensitivity, line patterns are used as C, M, Y and K test patterns. Different line patterns provide scanner sensitivity comparision. To optimize signal to noise ratio, C, M, Y line patterns 802-806 are used instead of compK pattern (e.g., 380 in FIG. 4C). Solid fill, one on/one off, one on/two off, one on/three off line patterns are used as C, M, Y and K. For example, in case of a one ON/one OFF pattern, jet may be ON for one line and is OFF for one line. K line patterns (or strips) 808 are used for reference.

Next at procedure 710, from measured test patterns of FIG. 8, reference intensity model and CMY intensity model may be obtained by curve fitting the image data. The gray balance is achieved by driving CMY intensity profiles toward their K reference profiles so that the compK will have the same hue as pure K.

At procedure 712, a compensating offset is obtained by computing the difference between CMY intensity model and corresponding K reference intensity model. Next at procedure 714, this compensating or correction offset is applied for print head voltage control for gray balance.

According to another aspect of the present disclosure, a method for printing a test pattern for gray balance calibration in an image printing system is provided. The method includes printing, using a print engine, a reference test pattern portion consisting essentially of black marking medium; and printing, using the print engine, a test pattern portion comprising a combination of marking mediums of different colors, other than the color black, available on the image printing system to simulate the black marking medium. The reference test pattern portion and the test pattern portion have different hue and lightness from each other.

Each of the reference test pattern portion and the test pattern portion includes a plurality of patches with varying area coverage. For example, each of the reference test pattern portion and the test pattern portion may include four patches with varying area coverage or eight patches with varying area coverage.

In each of the reference test pattern and the test pattern portion, the plurality of patches are unequally spaced apart from one another. For example, in a four strip pattern (i.e., either the reference test pattern or the test pattern portion), the patches may be spaced at 12%, 30%, 52% and 87%. The un-equally spaced strips are better for representing a TRC curve.

In each of the reference test pattern and the test pattern portion, the plurality of patches are equally spaced apart from one another. For example, in a four strip pattern (i.e., either the reference test pattern or the test pattern portion), the patches may be spaced at 20%, 40%, 60% and 80%.

The present disclosure, thus, proposes the use of a scanner to determine gray balance calibration for a four-color printer in a multifunction device. The present disclosure uses the black (K) channel as a reference and balances the C, M, and Y channels according to this reference. It is distinct from prior art describing visual techniques to gray-balance the CMY channels using K as a reference. The present disclosure eliminates the need for spectrophotometric measurement or manual/visual inspection. Also, the present disclosure solves solid inkjet gray line shifting problem and printhead drop mass calibration problem.

A composite black color or a process black color may be obtained by combining all of the primary colors (e.g., Cyan (C), Magenta (M) and Yellow (Y)) available in the image printing system. For example, the composite black color or the process black color may be obtained by combining the standard cyan, magenta, and yellow colors available in the image printing system, such as in equal amounts.

As used herein, the word "printer" encompasses any apparatus that performs a print outputting function for any purpose, such as a digital copier, bookmaking machine, facsimile machine, a multi-function machine, or the like.

In embodiments of the present disclosure, the processor, for example, may be made in hardware, firmware, software, or various combinations thereof. The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for gray balance calibration in an image printing system, wherein the method is implemented in a computer system comprising one or more processors configured to execute one or more computer program modules, the method comprising:
    (a) printing, using a print engine, a reference test pattern consisting essentially of black marking medium;
    (b) sensing, using a sensor, the reference test pattern to obtain a reference image data, the reference image data being a function of the black marking medium;
    (c) printing, using the print engine, a second test pattern comprising a combination of marking mediums of different colors, other than the color black, available on the image printing system to simulate the black marking medium;
    (d) sensing, using the sensor, the second test pattern to obtain a second image data, the second image data being a function of the combination of marking mediums;
    (e) obtaining second intensity profiles using the second image data and reference intensity profiles using the reference image data; and
    (f) determining a difference between the reference intensity profiles and the second intensity profiles to obtain an intensity correction offset for gray balance calibration in the image printing system.

2. The method according to claim 1, wherein the correction offset is configured to minimize a hue difference between the reference image data and the second image data.

3. The method according to claim 1, wherein the correction offset is configured to minimize both a hue difference and a lightness difference between the reference image data and the second image data.

4. The method according to claim 1, further comprising applying the correction offset to adjust gray-balanced CMY Tone Reproduction Curves (TRCs) for gray balance calibration of dithered colors.

5. The method according to claim 1, further comprising applying the correction offset to adjust voltages of print heads in the image printing system for gray balance calibration of solid colors and/or dither colors.

6. The method according to claim 1, wherein the sensor is a linear sensor array.

7. The method according to claim 6, wherein the linear array sensor is a full width array (FWA) sensor.

8. The method according to claim 1, wherein the second intensity profiles are obtained by curve fitting the second image data and the reference intensity profiles are obtained by curve fitting the reference image data.

9. The method according to claim 8, wherein the curve fitting is a polynomial curve fitting.

10. The method according to claim 1, further comprising maintaining the obtained intensity correction offset within a desired range using a closed loop feedback control.

11. The method according to claim 10, wherein maintaining includes
    comparing the obtained intensity correction offset to a predetermined threshold; and
    repeating procedures (a) through (f), when the intensity correction offset exceeds the predetermined threshold.

12. The method according to claim 11, wherein the predetermined threshold is a numeric value, a percentage value or a range.

13. A system for gray balance calibration in an image printing system, the system comprising:
    a print engine configured to print
        a) a reference test pattern consisting essentially of black marking medium, and
        b) a second test pattern comprising a combination of marking mediums of different colors, other than the color black, available on the image printing system to simulate the black marking medium;
    a sensor configured to sense
        a) the reference test pattern to obtain a reference image data, the reference image data being a function of the black marking medium, and
        b) the second test pattern to obtain a second image data, the second image data being a function of the combination of marking mediums; and
    a processor configured to:
        obtain second intensity profiles using the second image data and reference intensity profiles using the reference image data; and
        determine a difference between the reference intensity profiles and the second intensity profiles to obtain an intensity correction offset for gray balance calibration in the image printing system.

14. The system according to claim 13, wherein the correction offset is configured to minimize a hue difference between the reference image data and the second image data.

15. The system according to claim 13, wherein the correction offset is configured to minimize both a hue difference and a lightness difference between the reference image data and the second image data.

16. The system according to claim 13, further comprising a controller configured to apply the correction offset to adjust gray-balanced CMY Tone Reproduction Curves (TRCs) for gray balance calibration of dithered colors.

17. The system according to claim 13, further comprising a controller configured to apply the correction offset to adjust voltages of print heads in the image printing system for gray balance calibration of solid colors and/or dither colors.

18. The system according to claim 13, wherein the sensor is a linear sensor array.

19. The system according to claim 18, wherein the linear array sensor is a full width array (FWA) sensor.

20. The system according to claim 18, wherein the linear sensor array is associated with an image input scanner for scanning hard-copy documents.

* * * * *